March 8, 1960  P. HIEB  2,927,545
ROTARY BAKERY OVEN STABILIZER
Filed April 12, 1956  2 Sheets-Sheet 1
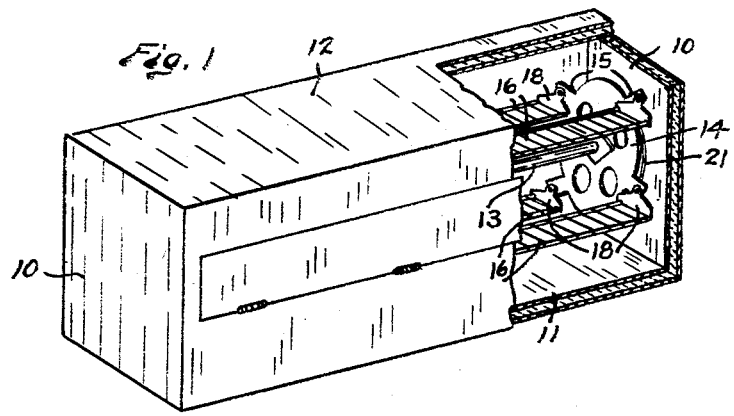
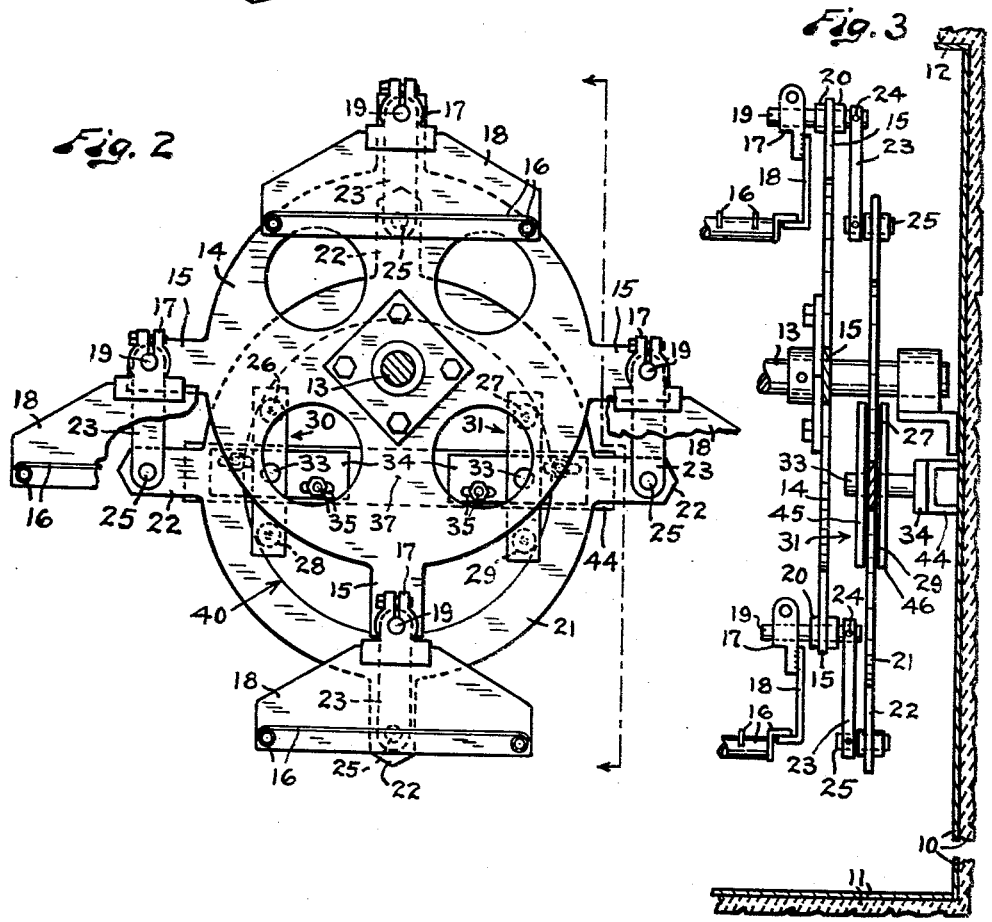
INVENTOR.
Peter Hieb
BY
G. Wright Arnold
ATTORNEY March 8, 1960 P. HIEB 2,927,545
ROTARY BAKERY OVEN STABILIZER
Filed April 12, 1956 2 Sheets-Sheet 2
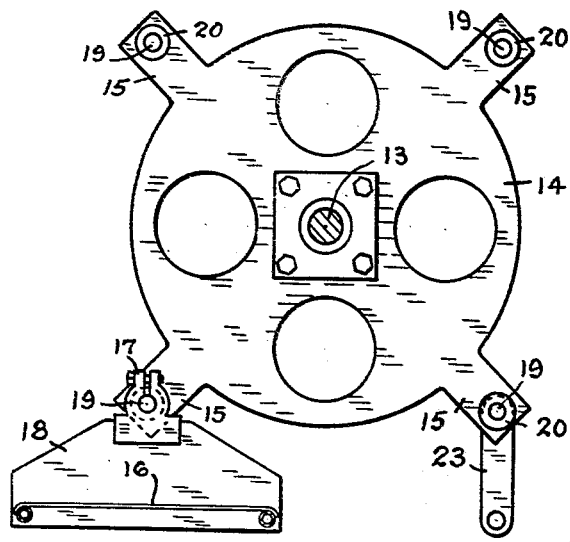
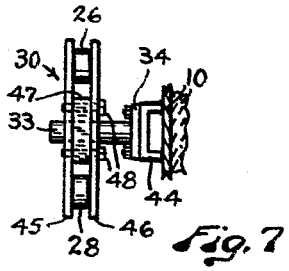
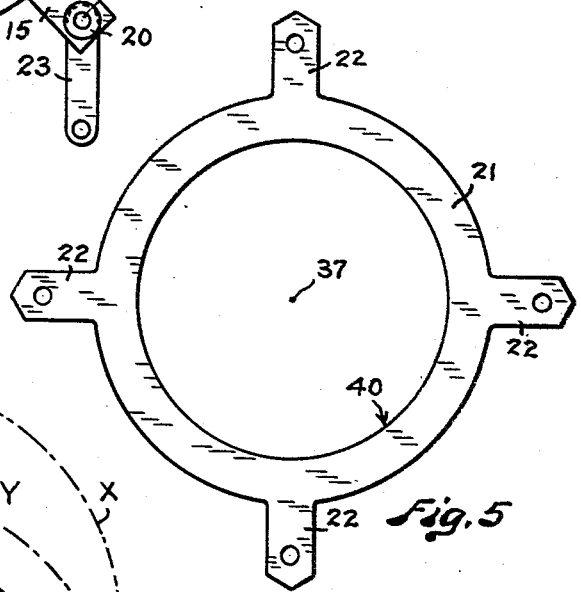
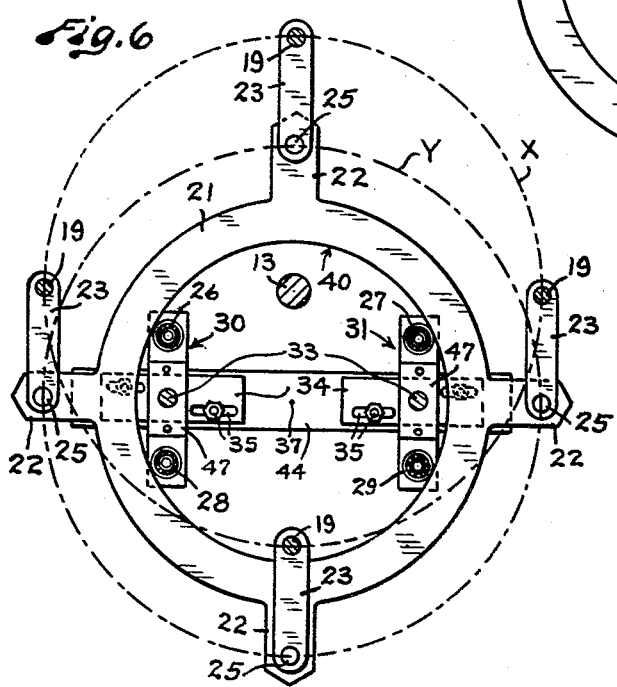
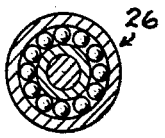
INVENTOR.
Peter Hieb
BY
ATTORNEY

United States Patent Office 2,927,545
Patented Mar. 8, 1960

2,927,545

ROTARY BAKERY OVEN STABILIZER

Peter Hieb, Seattle, Wash.; Josephine Hieb, executrix of said Peter Hieb, deceased Application April 12, 1956, Serial No. 577,786

8 Claims. (Cl. 107—59)

My invention relates to a rotary baking oven.

Particularly my invention relates to a rotary baking oven characterized by having vibration of the suspended baking product carrying shelves or trays reduced to a minimum or substantially eliminated.

Disturbance of the dough while baking by vibration is positively very objectionable. The loaves or formed baking products should be maintained as completely still or undisturbed as possible during the baking operation. Otherwise, the finished product lacks that lightness and fineness of texture which characterizes the best high-grade baked products. This applies to bread, and much more so to cakes.

Rotary baking ovens require that the shelves or product trays be maintained in a horizontal position while at the same time being rotated to expose the baking product to the baking temperature in the various parts of the oven. The means heretofore employed for so maintaining the trays or shelves imparts a highly objectionable vibration or jarring to said trays. The means intended to stabilize the trays operates to impart a "grinding" action, as it were, which causes vibration in the assembly. There is a relatively heavy load to be carried. With a shelf or tray designed to accommodate a load of 32 loaves of bread, each tray load, counting its own weight, amounts to about 175 pounds when the baking commences.

There would be a plurality of these shelves or trays, ordinarily four or more, and these must be supported under high temperatures of baking magnitude, so that the mechanism involved must be relatively heavy for the load, and working in the dry and heated air tends to develop vibration. It is desirable not to have any material such as grease on the bearings for the reason that odors may be developed due to the high temperature, and these odors would be objectionable as they would be subject to absorption by the baking goods.

All of these features and conditions of operation, or one or more of them, it is apparent, may well develop vibrations as the structure revolves in bringing the loaves of bread or the cakes to the high-heat area of the different portions of the baking oven.

The fundamental and primary object of my invention is to overcome and reduce to a minimum, or entirely eliminate, the vibration problem in rotary baking ovens, which vibration affects the baking of and the quality of bakery goods.

A primary object is to provide a readily adjusted pivotally mounted plurality of rollers which support or mount the reel part of the oven, so that the forcing of the load over the rollers is eliminated, since all such forcing operation tends to impart vibrations and jars to the trays or shelves.

In a summary manner and therefore incompletely stated, my invention involves providing the automatic adjustment of the various means connected with the baking trays of a rotary oven whereby the objectionable jarring of the products while baking is minimized or substantially eliminated, with the result that a greatly improved baking product is produced.

In the above it is seen that contrary and opposed considerations are encountered in overcoming the objection to present-day rotary ovens. On the one hand we have a relatively heavy tray mechanism to be supported and maintained in a horizontal position in exposing the baking goods to the different areas of the oven. On the other hand, the use of lubricants which would normally contribute to smooth operation can not well be employed because of the possible absorption thereof by the baking goods and consequent injury to the taste thereof. The device of my invention operates automatically in adjusting the rollers (the same being floatingly mounted) to avoid pinching of the metal parts, which would operate to produce vibration.

The above-mentioned general objects of my invention, together with others inherent in the same, are attained by the mechanism illustrated in the following drawings, throughout which like reference numerals indicate like parts:

Fig. 1 is a view in perspective of a rotary baking oven embodying my invention, with part of the insulated walls broken away to reveal the interior showing the general arrangement of the reel with its tray carrying mechanism and the stabilizer ring for the trays;

Fig. 2 is a cross-sectional view in elevation looking from the longitudinal center of the oven toward one end (right side) of the oven;

Fig. 3 is a view in side elevation taken on the section line of Figure 2 of one end of the reel and stabilizer ring and associated mechanism;

Fig. 4 is a separate view in elevation of the reel with its tray carrying mechanism;

Fig. 5 is a separate view in elevation of the stabilizer ring for said tray mechanism;

Fig. 6 is a similar view of the stabilizer ring assembled with the stabilizer arms and showing in dotted lines about their respective axes of rotation the paths X of the reel short shaft, and Y of the transverse pin of the stabilizer ring;

Fig. 7 is a view in end elevation of the stabilizer arms and their rigid mounting to the end wall of the oven; and Fig. 8 is a sectional view of the rotatable bearing preferably employed in the stabilizer mechanism.

These ovens each comprise a fairly large enclosure (Fig. 1) formed of refractory walls and having electric or other suitable means for heating the interior to a baking temperature. A fragment of the oven enclosure is shown in Fig. 3, and comprises an end wall 10, a bottom wall or floor 11, and a top wall 12. The ovens are of substantial length, for instance 8 or 10 feet, and they have rotary devices extending throughout their length and including horizontal trays which carry the goods and which revolve within the oven after the manner of passenger carrying cars or seats of a "Ferris wheel" which must be kept horizontal as to their floods while revolving.

The tray carrying mechanism may be, and preferably is, in duplicate at the two ends of the oven to obtain the optimum advantages of my invention and discovery. Only the mechanism at one end of the oven is shown in the drawings. This tray carrying mechanism comprises a longitudinally extending driven shaft 13 having near each end a fixedly attached reel 14. Each reel 14 has radial arms 15 from which open work trays 16 for carrying the bakery products are suspended by clamps 17 which are welded to tray ends 18 and which clamp onto short shafts 19. Each short shaft 19 is rotatively supported in a graphite bushing which is pressed into a threaded pipe sleeve 20 screwed into the arms 15 (the combination of the graphite bushing held fast in the threaded pipe being purchasable on the market).

It has been found necessary to attach stabilizer means to the reel to prevent vibration, insure even and smooth movement of the reel, and prevent tilting of the trays 16, that is, to keep them horizontal.

The stabilizing means comprises a stabilizer ring 21 having radial arms 22 corresponding in number and positioning to the arms 15 (four in number being shown) and connected by links 23 with the short shafts 19. Each link 23 has a fixed connection 24 with one of the short shafts 19 and a pivotal connection by means of a transverse pin 25 with an arm 22 of the stabilizer ring 21.

The stabilizer ring 21 is supported for rotation by four rotatable bearings 26, 27, 28 and 29 (Fig. 6), preferably of a ball bearing type (see Fig. 8) which are mounted between the respective ends of arms 30 and 31. Each arm 30 and 31 is formed of two plates 45 and 46 (Fig. 7) rigidly held in spaced apart relation by a spacer block 47 and screws 48. Between the plates 45 and 46 the rotatable bearings 26, 27, 28 and 29 (Fig. 6), may be mounted in any of the usual ways employed in mounting rotatable bearings, such as ball bearings. For example, a mounting pin may be employed having an enlarged central portion extending through and supporting the inner race of the ball bearing so that reduced end portions are provided with shoulders. One reduced end portion may extend through a hole in one of the plates 46 forming the arm and the end of the pin extending slightly beyond the outer face of the plate may be welded so as to provide a fixed pin in said plate. A hole in the end portion of the opposite plate, as 45, may receive the other reduced end of the mounting pin which end may have a cotter pin receiving hole. Accordingly, after the bearing is positioned on the enlarged central portion of the mounting pin, the plate 45 is pressed over the reduced end and a cotter pin inserted in the hole of the mounting pin. Thus, the side plates 45 and 46 provide an open top between their end portions to receive the ring 21 which is therefore free to expand in response to the heat in the oven. The corners of the plates 45 and 46 (see Figs. 2 and 7) function as guides by engaging the sides of the ring 21. The ring 21 is held against sidewise displacement by the plates 45 and 46. Each arm 30 and 31 is pivotally mounted on a stud pin or shaft 33 which is rigid with a plate 34, and said arms 30 and 31 are slidably mounted on stud pin or shaft 33 so they have two movements, one due to their pivotal mounting and one due to their slidable mounting on stud pin 33. Each plate 34 is adjustably secured by slot and screw means 35 to a channel bar 44 which is rigid with the oven wall 10. The rollers 26, 27, 28 and 29 engage with the inner circular periphery 40 of the stabilizer rings 21 and support said rings for rotation substantially about an axis 37 which is below the axis of the shaft 13.

Rotation of the shaft 13 will carry the short shafts 19 around on the circle X, Fig. 3. At the same time, the pivot pins 25 will be caused to move around on a circle Y of equal diameter to circle X, as the stabilizer ring travels about the center 37 around the rollers 26 to 29. These rollers 26–29 being mounted at the end portions of the arms 30 and 31 provide a secure truss-like mounting for the stabilizer ring 21. At the same time, since the arms 30 and 31 are pivotally mounted on short shafts 33 and are movable longitudinally of each pin or shaft 33, the rollers 26–29 are adapted to readily move in two directions in adjusting circumferentially to the rotating movement of the ring and thus avoid any pinching, that is, of a character which might produce vibration. This adjustable supporting means of the four rollers 26–29, together with their mounting upon the pivotally mounted arms at 33 operates to provide a four point floating support or contact and thus to practically eliminate shock and vibration. By this arrangement the device is able to do away with vibration of the reel and to keep the reel moving smoothly and uniformly while holding the trays 16 always horizontal. The roller contact has four points within the stabilizer ring and the equalizing movement provided by the pivoting of the bars 30 and 31 on the pivots 33 greatly improves the operation of the stabilizer. Any jarring or vibration seriously affects certain doughs, especially cakes as well as bread. In short, such smoothness of operation is of the utmost importance, and having the rollers 26 and 27 on one side of the device and 28 and 29 on the other side overcomes and eliminates binding with its accompanying vibration or jarring which characterized the prior art operation.

In conclusion, the device embodying the above invention provides for floatingly mounting the means which would grip, pinch, or bind parts of the mechanism and thus set up vibration in the products during their baking. Such vibration in the baking products operates definitely to the detriment of the same. The mechanism of my invention and discovery provides for the automatic adjustment of the parts to the paths of travel thereof, even though the same may be distorted due to heat expansion thereof.

I claim:

1. A rotary baking oven comprising an oven compartment having end walls; a rotatable shaft mounted in said oven compartment; a tray carrying reel mounted on said shaft; short shafts rotatably mounted in the peripheral portion of said reel; baking article supporting trays carried by one end of each of said short shafts of said reel; a link keyed to the other end portion of each of said short shafts and carrying a bearing pin on the opposite end of said link; a stabilizing ring connected to said bearing pins; a stud shaft fixedly supported from an end wall of said oven; and an arm member pivotally mounted on said stud shaft, said member having rollers mounted on each end portion of said arm, said rollers engaging the inner periphery of said stabilizing ring for supporting the same on its inner periphery, said rollers being circumferentially spaced with respect to each other along said inner periphery.

2. A rotary baking oven comprising an oven compartment having end walls; a driven rotatable shaft mounted in said oven compartment; a tray carrying reel mounted on said shaft, said reel having arms extending diametrically beyond the periphery of said reel in balanced relation; short shafts rotatably mounted in the outer end portion of each arm of said reel; baking article supporting trays having end plates mounted on one end portion of said short shafts in said reel; a link keyed to the other end portion of each of said short shafts and carrying a bearing pin on the opposite end of said link; a stabilizing ring connected to said bearing pins; a stud shaft fixedly supported from an end wall of said oven; and an arm member pivotally mounted on said stud shaft, said member having rollers mounted on each end portion of said arm, said rollers engaging the inner periphery of said stabilizing ring for supporting the same on its inner periphery, said rollers being spaced with respect to each other circumferentially along said inner periphery.

3. A rotary baking oven according to claim 1 wherein said arm member has two side plates held in fixed spaced relation, and said rollers comprise ball bearings disposed between the end portions of said plates and engaging the inner periphery of the stabilizing ring received between the end portions of said side plates.

4. A rotary baking oven comprising an oven compartment having end walls; a rotatable shaft mounted in said oven compartment; a tray carrying reel mounted on said shaft; short shafts rotatably mounted in the peripheral portion of said reel; baking article supporting trays carried by one end of each of said short shafts in said reel; a link keyed to the other end portion of each of said short shafts and carrying a bearing pin on the opposite end of said link; a stabilizing ring connected to said bearing pins; bolts fixedly supported on each end wall by a channel member mounting; said bolts protruding beyond the web of said channel member; a plate adjustably, slidably disposed on said channel member having slots receiving the protruding end portions of said bolts and carrying a fixedly mounted stud shaft disposed normally to said plate; and an arm member pivotally and slidably mounted on said stud shaft, said arm member having bearing means engaging the inner periphery portion of said stabilizing ring for supporting the same; said bearing means being spaced with respect to each other circumferentially along said inner periphery.

5. In a rotary baking oven having end walls; a stabilizing ring revolvably disposed between said end walls; a stud shaft fixedly secured on each end wall and spaced from the axis of rotation of said ring a distance less than the radius of the inner periphery of said ring; bearing mounting means having end portions and pivotally mounted on said shaft; ball bearings mounted in the end portions of said bearing mounting means, said ball bearings engaging the inner periphery of said ring with at least one ball bearing engaging said ring above the horizontal axis of rotation thereof.

6. In a rotary baking oven, the combination of end walls; a stabilizing ring revolvably disposed between said end walls; a stud shaft adjustably fixedly secured on one of said end walls and spaced from the axis of rotation of said ring a distance less than the radius of the inner periphery of said ring and extending longitudinally shortly beyond the plane of the inner periphery of the stabilizing ring toward the longitudinal center of the oven; rotatable bearing mounting arms pivotally mounted on said stud shaft, the end portions of said arms being provided with openings for receiving rotatable bearing means; and rotatable bearing means mounted in said bearing openings in said end portions of said arms and supportingly engaging the inner periphery of said ring.

7. In a rotary baking oven, the combination of end walls; a tray carrying reel mounted between said end walls rotatable about a longitudinal axis of said oven; a stabilizing ring for said reel functioning to nullify vibration of said reel; a stud shaft mounted on one of said end walls in radially spaced relation to said longitudinal axis and extending parallel to said longitudinal axis shortly beyond the plane of said stabilizing ring toward the longitudinal center of the oven; a floating arm pivotally and slidably mounted on said stud shaft, said slidable movement on said stud shaft being automatic for adjusting the position of said arm on said shaft in reducing vibration; and rotatable bearings mounted on each end portion of said arm engaging the inner periphery of said stabilizing ring with an arc of said ring therebetween, each of said bearings cooperating in the automatic adjusting of the position of said arm on said stud shaft.

8. In a rotary baking oven, the combination of end walls; a tray-carrying reel mounted between said end walls rotatable about a longitudinal axis of said oven; a stabilizing ring for said reel functioning to nullify vibration of said reel; a shaft mounted on one of said end walls and in radially spaced relation to said longitudinal axis and extending parallel to said longitudinal axis shortly beyond the plane of said stabilizing ring toward the longitudinal center of the oven; a floating arm pivotally and slidably mounted on said shaft, said slidable movement on said stud shaft being automatic for adjusting the position of said arm on said shaft in reducing vibration; said arm having recesses in the end portions thereof; and rotatable bearings mounted on each end portion of said arm within said recesses, said bearings engaging the inner periphery of said stabilizing ring with an arc of said ring between said bearings, the side walls of said recesses of said arm operating as a guide for said ring.

References Cited in the file of this patent

UNITED STATES PATENTS

| | | |
|---|---|---|
| 2,149,439 | Hatch | Mar. 7, 1939 |
| 2,181,323 | Glezen | Nov. 28, 1939 |
| 2,718,200 | Houlis | Sept. 20, 1955 |

FOREIGN PATENTS

| | | |
|---|---|---|
| 143,809 | Great Britain | June 3, 1920 |